No. 888,262. PATENTED MAY 19, 1908.
W. P. QUENTELL.
CALCULATING MACHINE.
APPLICATION FILED APR. 26, 1907.

6 SHEETS—SHEET 2.

WITNESSES:
William Miller
Edward Wiesner

INVENTOR
William P. Quentell
BY
W. C. Hauff
ATTORNEY

No. 888,262. PATENTED MAY 19, 1908.
W. P. QUENTELL.
CALCULATING MACHINE.
APPLICATION FILED APR. 26, 1907.
6 SHEETS—SHEET 3.
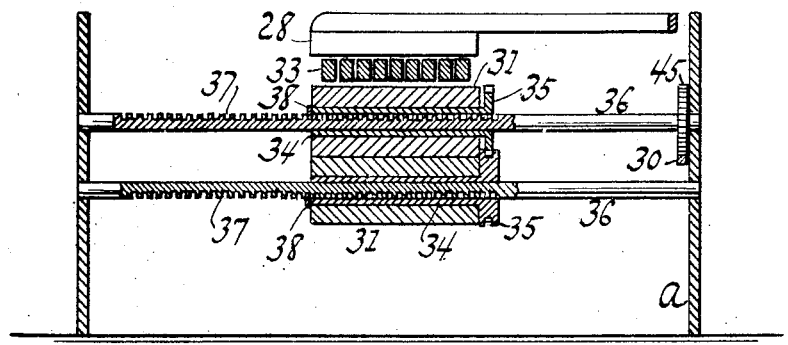
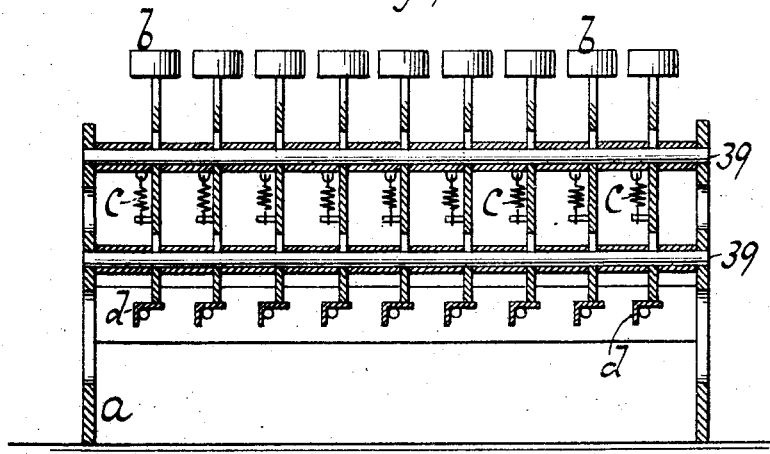
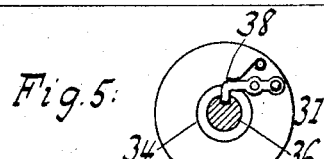
WITNESSES:
INVENTOR
William P. Quentell
BY
ATTORNEY No. 888,262. PATENTED MAY 19, 1908.
W. P. QUENTELL.
CALCULATING MACHINE.
APPLICATION FILED APR. 26, 1907.

6 SHEETS—SHEET 4.

WITNESSES:
William Miller
Edward Nieuwes

INVENTOR
William P. Quentell
BY
W. C. Hauff
ATTORNEY

No. 888,262. PATENTED MAY 19, 1908.
W. P. QUENTELL.
CALCULATING MACHINE.
APPLICATION FILED APR. 26, 1907.

6 SHEETS—SHEET 5.

WITNESSES:
William Miller
Christian Almstead

INVENTOR
William P. Quentell
BY
W. C. Hauff
ATTORNEY

No. 888,262. PATENTED MAY 19, 1908.
W. P. QUENTELL.
CALCULATING MACHINE.
APPLICATION FILED APR. 26, 1907.

6 SHEETS—SHEET 6.

WITNESSES:
William Miller
Edward Siesser

INVENTOR
William P. Quentell
BY
W. C. Hauff
ATTORNEY

UNITED STATES PATENT OFFICE.

WILLIAM P. QUENTELL, OF NEW YORK, N. Y., ASSIGNOR TO AGNES R. QUENTELL, OF STAMFORD, CONNECTICUT.

CALCULATING-MACHINE.

No. 888,262.　　　Specification of Letters Patent.　　　Patented May 19, 1908.

Application filed April 26, 1907. Serial No. 370,492.

*To all whom it may concern:*

Be it known that I, WILLIAM P. QUENTELL, a citizen of the United States, residing at New York city, in the county of New York and State of New York, have invented new and useful Improvements in Calculating-Machines, of which the following is a specification.

Figure 1:
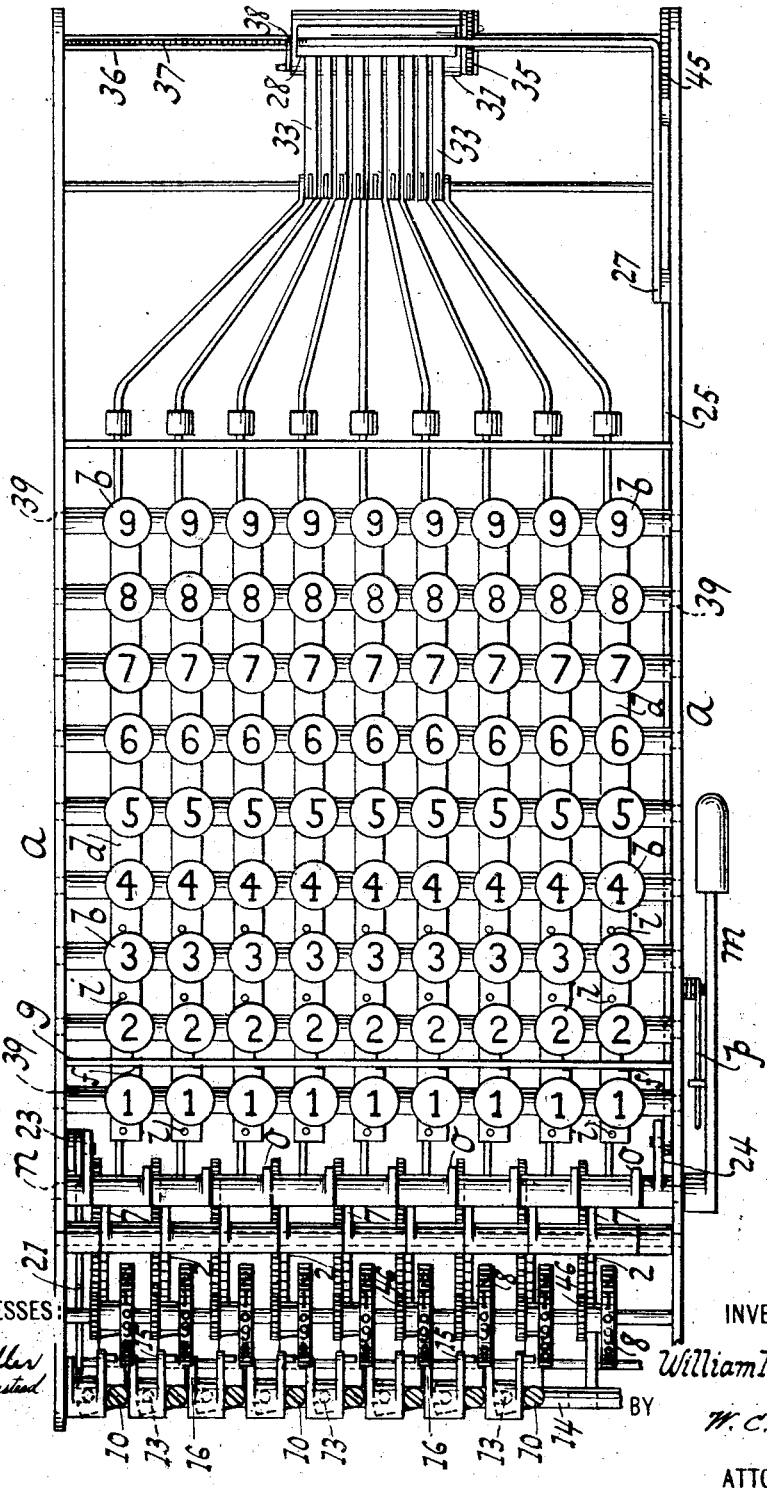
Figure 2:
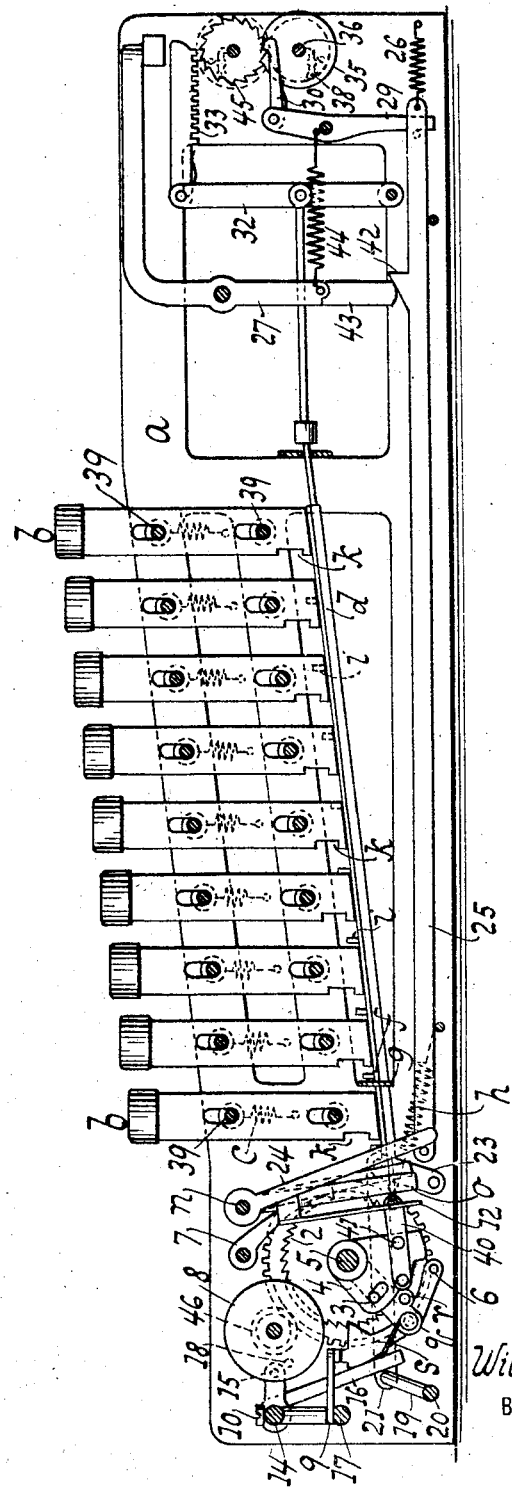
Figure 6:
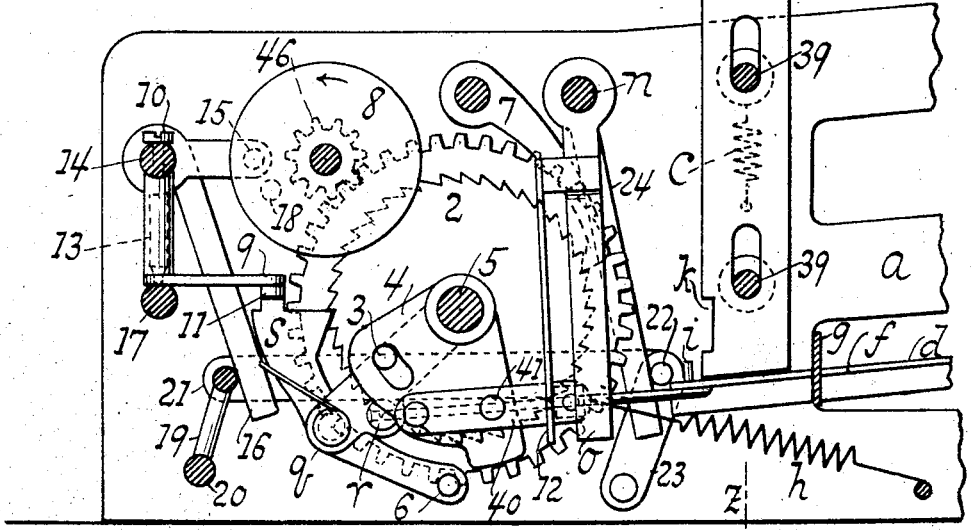
Figure 7:
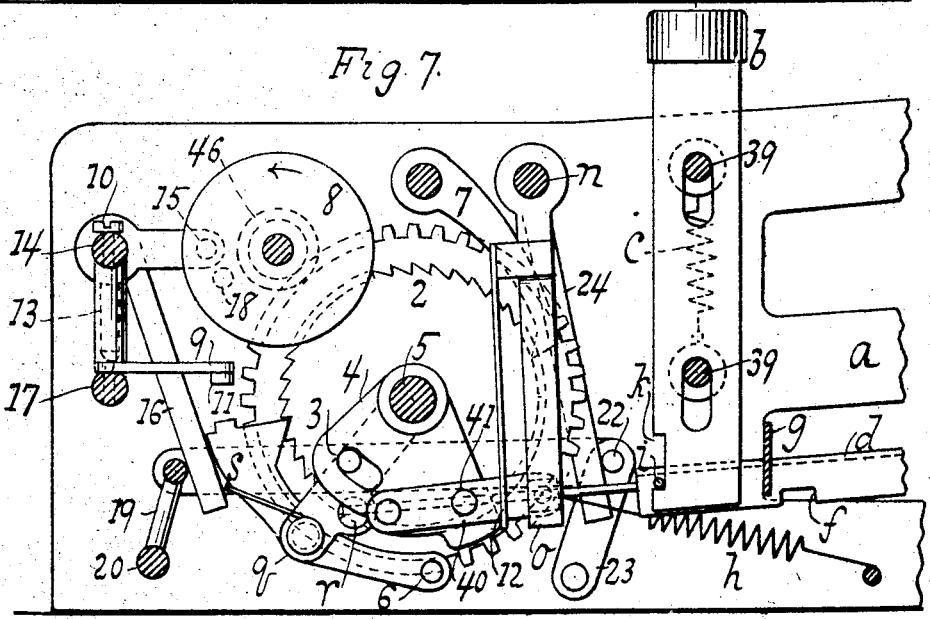
Figure 8:
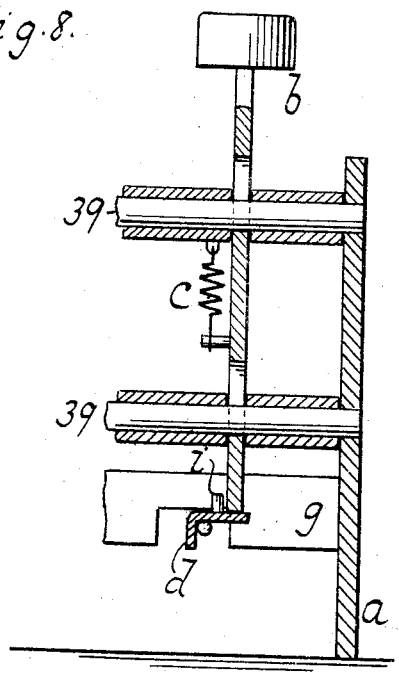
Figure 9:
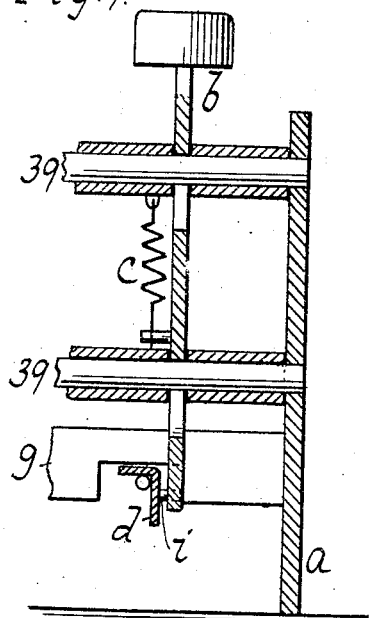
Figure 10:
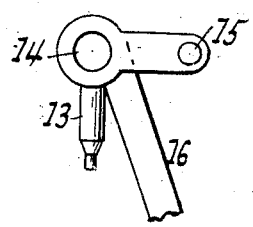
Figure 11:
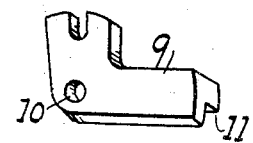
Figure 12:
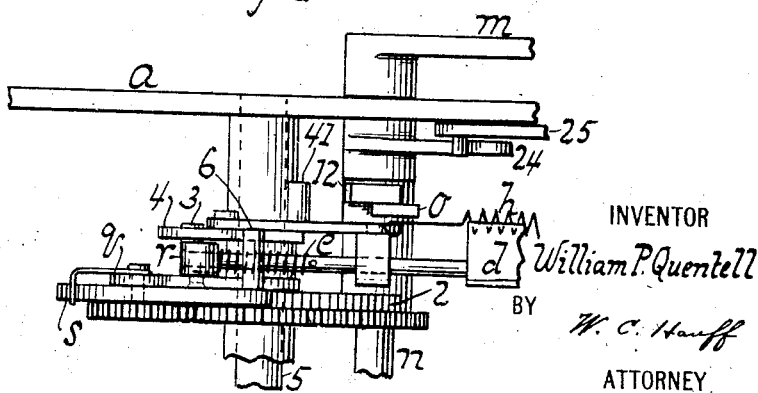
Figure 13:
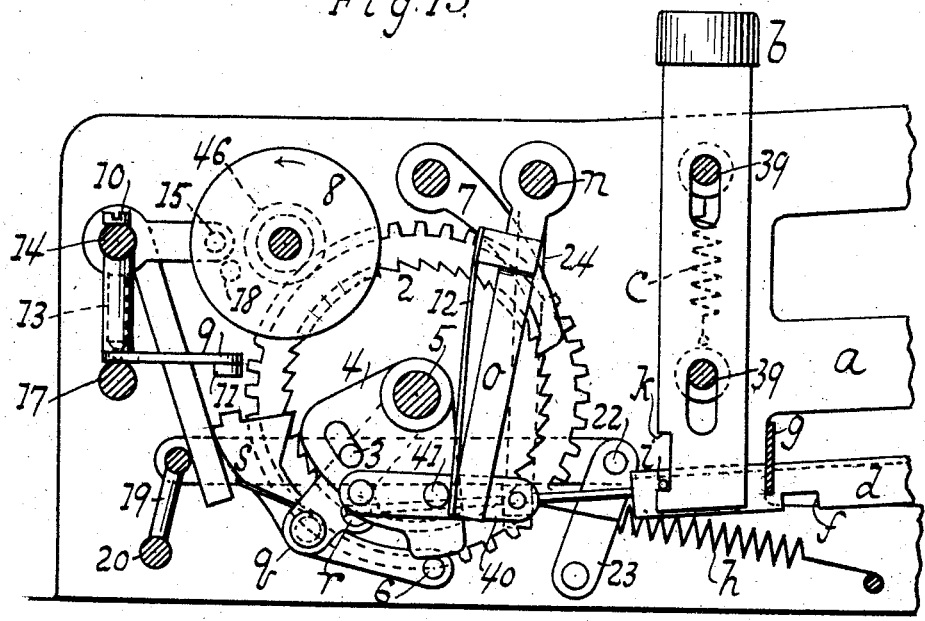
Figure 14:
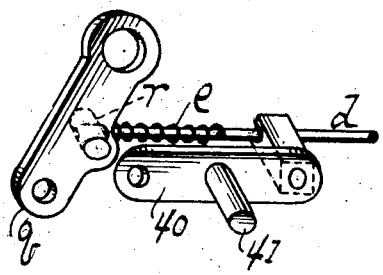

This invention relates to certain details of construction the nature and object of which is set forth in the following specification and claims and illustrated in the annexed drawing in which Figure 1 is a plan view of a device embodying this invention showing the series of keys and computing mechanism. Fig. 2 is a side view with one side of the frame sectioned off to expose certain parts. Fig. 3 is a sectional view of printing mechanism, sectioned along line $x$—$x$, Fig. 2. Fig. 4 is a section along line $y$—$y$, Fig. 2. Fig. 5 is an end elevation of paper rollers. Fig. 6 is a side elevation of ratchet and pawl mechanism, part of the frame being cut off. Fig. 7 is a view illustrating the parts shown by Fig. 6 in a different position. Fig. 8 is a section along line $z$—$z$, Fig. 6. Fig. 9 shows the parts illustrated by Fig. 8 in a different position. Fig. 10 shows mechanism for actuating a pawl stop. Fig. 11 shows a pawl stop in detail. Fig. 12 shows an inverted plan view of ratchet and pawl mechanism. Fig. 13 is a sectional elevation of part of the mechanism and showing the drive lever as having moved the pawl lock to active position. Fig. 14 is a perspective view of the pawl carrier with adjacent parts, such as coil spring and driving pin with link.

In this drawing is shown a frame $a$ and keys $b$ normally held raised by springs $c$ above bars $d$. These bars slide and swivel. Several bars with respective rows of keys are shown but the explanation of one sets forth the operation of the machine. A spring $e$ Fig. 12 coiled about the bar tends to normally hold or swivel the bar so that its cut or shoulder part $f$ Figs. 6 and 7 engages a detent bar fixed to the frame. The bar is thus held against sliding or longitudinal movement. When the bar is tilted Figs. 7 and 9 to clear itself from the detent $g$ the spring $h$ slides the bar backward. The stud or studs $i$ on the bar has also been moved by the tilt of such bar so that this stud is arrested in a cut $k$ forming a shoulder or stop part in the key.

As the stud $i$ engages the stop $k$ the slide of the bar is arrested and the key also is held in depressed position for the time being. As the studs $i$ are placed at different distances from their respective keys the bar has a different extent of slide or longitudinal movement as one key or another is depressed. The return or forward slide of the bar is effected by a drive lever $m$ fulcrumed at $n$. This fulcrum axle $n$ has arms $o$ one for each bar $d$. A spring $p$ normally raises or returns the drive lever. As a bar is returned or slid forward such bar swings a pawl carrier or arm $q$ which has a block or bearing point $r$ Fig. 12 where the front end of the bar is swivelingly supported. The torsional spring $e$ connected at one end to the bar is braced at the other to this bearing block $r$. The rear end of the bar swivels and slides in the frame or a suitable part of the machine. The bar recedes or is pulled back by spring $h$ which draws back the pawl carrier $q$ and the pawl $s$. The return or forward movement causes the pawl to move the ratchet 2 one or more steps as called for. The ratchet connects with the computing mechanism hereinafter referred to. The return or forward slide of the bar also frees the depressed key so that the latter rises to its level or elevated position for further operations.

The pawl carrier $q$ has a loose connection such as pin and slot with a pawl lock or mutilated disk. The pin of the connection is shown at 3 and the disk at 4. This lock 4 as also the pawl carrying arm $q$ and the ratchet 2 are mounted on the common center or axle 5. After the bar has moved the lock disk 4 a certain distance forward to lock position with pin 6 then the carrying arm $q$ is moved by the connection at 3 and thus causes the ratchet 2 to be moved by the pawl $s$. The pawl is thus locked to the ratchet and the latter cannot move after the pawl is arrested. Any inaccuracy by the ratchet jumping or moving after the pawl is arrested is thus prevented. Rapid operation can thus take place without affecting the accurate or clean cut rotation of the computing mechanism.

The detent pawl 7 is familiar in ratchet mechanism or the like. The retracting spring $h$ above referred to is connected to this lock disk 4 and on the return the spring $h$ first retracts the lock 4 and this lock by connection 3 draws back pawl arm $q$ and bar $d$. The spring $h$ need not be directly connected to the lock 4 but is shown connected to a driving pin link 40 having a pin 41 against which strikes the driving arm o and its spring 12. The ratchets 2 by suitable gears or pinions actuate the numbered disks or register wheels 8 arranged in the usual way for units, tens, and so on. In the construction shown the numbered wheels consist each of a pinion sleeve 46 and the disk 8 carrying the pin 18. The invention is not limited to such construction however as the pin 18 could be made to protrude directly from the sleeve 46. All such modifications are included in the expression numbered wheels. When a numbered disk for example the unit disk starting from zero has reached nine, the next actuation of a key for said disk will have to show a total of ten or more. In other words when the unit wheel is rotated past nine the ten wheel must be actuated. This carry over from one column to another is obtained as follows: A pawl detent 9 is pivoted at 10. This pawl detent has a step or cut away part in its under face as indicated in Fig. 11 at the part 11. One such movable detent 9 is arranged for each numbered wheel or column except the unit column the pawl of which is arrested by a fixed detent or fixed part of the frame without cut away portion. Ordinarily the pawl s is arrested by the full part of the movable detent but when the cut or step part is in line with the pawl the latter can move one more figure which is the carry over from the column to the right. The pressure for giving the additional move or step is given by spring 12 on each arm o of the drive lever. As such drive lever is swung the spring 12 is compressed against the bar d or a suitable stop or stud 41 on said bar so as to cause the pawl to move into the step 11 when the latter is in line with the pawl. This pawl detent is engaged by an arm of lever 13 fulcrumed on bar 14. The other arm of this lever has a stud 15 and a third arm of this lever is shown at 16. The fulcrums 10 and 14 are at an angle to one another and the fulcrum 10 is supported in the bar or fulcrum 14 and in a bar 17 parallel to bar 14.

On the numbered wheel 8 is a stud 18 and at a suitable time this stud 18 strikes stud 15 and swings lever 13 to set the detent 9 with its step 11 in line with the pawl. The return of the detent is effected by the bail 19 engaging arm 16 and swinging the lever and detent back. The bail 19 Fig. 6 is fulcrumed at 20 and is connected to a link 21 supported at 22 by swinging arm 23. The pins 22 project into the paths of arms 24 on a fulcrum bar n. As the drive lever m returns or rises the respective arm 24 swings bail 19 and arm 16 to reset the detent 9. The drive lever or an arm 24 thereof also actuates a bar 25 Fig. 2 which is returned or slid back by spring 26. This reciprocating or slide bar actuates a lever 27 with hammer head 28 and also a lever 29 with pawl 30 actuating paper roller 31. The bars d set lever arms 32 carrying a type arm 33. This printing or tabulating arrangement can be of any suitable kind. The paper rollers 31 are mounted on sleeves 34 Fig. 3 and the gear wheels 35 connect the sleeves or rollers. One of the gear wheels is channeled and as one of the rollers is set laterally the gear wheels cause the other roller to be likewise set. The spindles 36 of the paper rollers or one of the spindles has shoulders or dents 37 along its length and a pawl 38 on the sleeve or rollers engaging such dents prevents accidental shift of the paper rollers. The carriage or support of the shafts 36 is fixed or does not move laterally.

The operation of the device is readily understood. As a key b guided by or sliding on cross rods 39 is depressed the bar d is tilted to free itself from the detent blade or fixed bar g and its spring h then slides or snaps the bar for stud i to lock the stem of key b which is now held depressed. At the same time the pawl s is retracted the desired distance. After the desired keys have been actuated the drive lever m is moved and such lever sliding the bars d forward releases the keys which again rise to the former level. At the same time the pawl mechanism actuates the numbered wheel or wheels and the arm 24 of lever m moves the connection 25 and the receding bar d has set its type line or bar 35. The total is shown at the sight line of wheels 8 and can be transferred to the paper of rollers 31 by the operator writing the separate figures showing the total.

On bar 25 is a cam face 42 Fig. 2 which engages a trip 43 on lever arm 27. This cam and trip 43 will actuate arm 27 when the bar moves forward, but on the return of the bar the trip 43 will yield and the arm 27 remains stationary. After the desired keys are set the lever m is depressed and through its arm 24 it draws forward bar 25 which by cam face 42 and arm 27 brings the hammer 28 to strike the type 33 to the paper. Further depression of lever m moves the cam 42 past the arm 27 liberating the hammer 28 which is returned by the spring 44. The lever m also by further movement brings arm o with its spring 12 to bear on pin 41 and thus conveys motion to the ratchet mechanism and numbered wheels 8. By having rollers 31 slidable on their shafts which latter are mounted on fixed bearings the paper can be shifted in relation to the printing mechanism so that more than one column can be added on the sheet without it being necessary to move the carriage laterally. The slide bar 25 actuates lever 29 with pawl 30 engaging a ratchet 45 on one of the shafts 36.

I claim:—

1. In a calculating machine, a bar mounted for lengthwise and pivotal movement, means for moving the bar lengthwise, a detent for holding the bar from such movement, and a key for pivotally moving said bar out of engagement with the detent and limiting the lengthwise movement thereof.

2. In a calculating machine, a bar mounted for lengthwise and pivotal movement, means for moving the bar lengthwise, a detent for holding the bar from such movement, a key for pivotally moving said bar out of engagement with the detent and limiting the lengthwise movement thereof, and means for automatically moving the bar lengthwise towards the key.

3. In a calculating machine, a bar mounted for lengthwise and pivotal movement, means for moving the bar lengthwise, a detent for holding the bar from such movement, and a key for pivotally moving said bar out of engagement with the detent and limiting the lengthwise movement thereof, the key and bar having interlocking parts for causing the key and bar to engage each other as the bar is moved towards the key.

4. In a calculating machine, a bar mounted for lengthwise and pivotal movement, means for moving the bar lengthwise, a detent for holding the bar from such movement, and a key for pivotally moving said bar out of engagement with the detent and limiting the lengthwise movement thereof, the said bar having a stop to engage with the key.

5. In a calculating machine, an indicating mechanism and an actuating bar therefor, a fixed detent for the bar, and means for swiveling the bar, means for moving the bar longitudinally for engagement and disengagement with the detent.

6. In a calculating machine, a computing mechanism having a ratchet, a pawl for driving the ratchet, a carrier for the pawl, an actuating bar swivelingly connected to the carrier, a detent for the bar, a key for swiveling the bar to disengage the detent, and a spring for swiveling the bar to engage the detent.

7. In a calculating machine, a computing mechanism having a ratchet connected thereto, a pawl for driving the ratchet, a pawl carrier, and a pawl lock consisting of a member moving concentrically with said pawl and ratchet, said lock having a pin and slot connection with the pawl carrier so that such lock will first move to the pawl and then propel the pawl.

8. In a calculating machine, a computing mechanism with a ratchet connected to the computing mechanism and a pawl for actuating the ratchet, a swinging pawl carrier, a pawl lock consisting of a disk loosely connected to and made to swing concentrically with the pawl carrier, and an actuating bar for the carrier and lock.

9. In a calculating machine, a computing mechanism with a ratchet connected thereto and a pawl for actuating the ratchet, a swinging pawl carrier, a pawl lock consisting of a disk made to swing concentrically with the pawl carrier, and means common to the lock and pawl carrier for moving the lock into engagement with the pawl and for also actuating the pawl.

10. In a calculating machine, a computing mechanism with a ratchet connected thereto and a pawl for actuating the ratchet, a pawl carrier, a pawl lock consisting of a disk concentric with the pawl carrier and made movable with respect to the pawl, and means for moving the pawl and for moving also the disk to engagement with the pawl to lock the pawl to the ratchet as well as for moving the disk clear of the pawl to allow the latter to ratchet back or move over the ratchet teeth.

11. In a calculating machine, a computing mechanism with a driving ratchet and ratchet driving pawl, a pawl carrier, a movable lock element for the pawl having a pin and slot connection with the pawl carrier so that after the lock element is moved to locking or unlocking position it moves the pawl carrier.

12. In a calculating machine, a computing mechanism with a driving ratchet and ratchet actuating pawl, a pawl carrier, and a lock for the pawl made in the form of a disk mounted concentrically with and loosely connected to the pawl carrier so as to move the latter and also to move to and from pawl locking position.

13. In a calculating machine, a computing mechanism with a ratchet and a pawl for driving said ratchet, a pawl carrier, a lock element loosely connected to the pawl carrier, and a driving lever for actuating the lock element to the limit of the loose connection and then to simultaneously move the lock and the pawl carrier, said lock and carrier being loose from one another so that the lock has a certain movement independently of the swing of the carrier.

14. In a calculating machine, a computing mechanism with ratchet and pawl, a pawl carrier, a lock for the pawl, a sliding actuating bar for the lock and pawl carrier, stops on the bar, and keys to coact with the stops to arrest the bar.

15. In a computing machine, series of keys, a register wheel for each series of keys, a ratchet and pawl for actuating each wheel throughout the entire movement required to register the number of a selected key, a detent for arresting each pawl at the end of each such movement, and means for moving the pawl detent for allowing a pawl to make an extra movement.

16. In a computing machine, a series of numbered wheels, ratchets and pawls one for each wheel for moving the wheels, pawl detents, and means for moving the pawl detents to give the pawls an extra movement to carry tens from one series to the next higher series, said detents being stepped and placed in advance of the moving means to arrest the latter both by the main and stepped portions of the detents.

17. In a computing machine, a register wheel, a ratchet and pawl for moving the wheel, a pawl detent, a lever for setting the detent transversely to the pawl, and a stud on the register wheel for engaging the setting lever.

18. In a computing machine, a register wheel, a ratchet and pawl for moving the wheel, a detent for the pawl, setting mechanism for the detent, a setting bail, and a stud on the register wheel, said bail and stud being made to positively set the detent to different positions.

19. In a computing mechanism, a register wheel, a ratchet and pawl for driving the wheel, a pawl detent, means for setting the detent, a driving arm for actuating the pawl, and a spring carried by the driving arm and actuating the pawl when the detent is set.

20. In a computing mechanism, a register wheel, a ratchet and pawl for the wheel, a pawl lock loosely connected to the pawl, a drive lever for moving the lock and pawl, a stepped pawl detent, a lever for setting the detent, a stud on the register wheel for moving the detent setting lever, and a spring on the drive lever for moving the pawl into the step of the detent.

21. In a computing mechanism, a reciprocating bar, a drive lever for actuating the bar, a pawl and ratchet, a stop for the pawl, a lever with arms for setting the stop, a register wheel actuated by the pawl and engaging an arm of the stop setting lever to set the stop, and a retracting bail actuated by the drive lever for engaging another arm of the stop setting lever.

22. A calculating machine comprising register wheels with rotating means for said wheels combined with a tabulating mechanism comprising a fixed support with shafts, paper feed rollers slidably mounted on the shafts and made to rotate therewith, printing mechanism, and means actuated by the calculating machine for automatically turning the rollers.

In testimony whereof I have hereunto set my hand in the presence of two subscribing witnesses.

WILLIAM P. QUENTELL.

Witnesses:
  CHRISTIAN ALMSTEAD,
  EDWARD WIESNER.